Fig. 4

Robert Grasselli
Robert A. Rightmire
INVENTORS

United States Patent Office 3,360,401
Patented Dec. 26, 1967

3,360,401
PROCESS FOR CONVERTING CHEMICAL ENERGY INTO ELECTRICAL ENERGY
Robert Grasselli, Cleveland, and Robert A. Rightmire, Twinsburg, Ohio, assignors to The Standard Oil Company, Cleveland, Ohio, a corporation of Ohio
Filed Sept. 29, 1965, Ser. No. 498,188
6 Claims. (Cl. 136—86)

This application is a continuation-in-part of copending application Ser. No. 79,710 filed Dec. 30, 1960, now abandoned.

This invention relates generally to the useful conversion of one form of energy to another, and particularly relates to an improved apparatus and method for accomplishing such conversion electrochemically.

More particularly, this invention relates to the enhancement of electrochemical conversion of energy of chemical combination into useful electrical energy and will for exemplory purposes, be described with reference to a fuel cell.

Still more particularly, this invention relates to the use of intermediate electron transfer species to increase the rate of flow of electrical energy from the cell. This greatly increases the efficiency of the cell.

General discussion

*Fuel cells.*—A fuel cell can be defined as an electrochemical device in which chemical reaction energy is converted directly into electrical energy. The fuel cell makes it possible to convert the energy of chemical reaction directly into useful work without employing a heat engine to drive a dynamo, etc. Thus the conversion is considerably simplified and efficiency is greatly increased.

Thus, fuel cells offer substantial potential for the development of electric power. They are quiet, have no moving parts, and do not produce the usual products of chemical reaction associated with a heat engine.

Fuel cells are of several types, all of which include spaced electrodes separated by some type of electrolyte.

The reaction involved is essentially the oxidation of a fuel at one electrode and the reduction of an oxidant at another electrode. Electrons are released at the electrodes and flow through the electrodes and to and through an external circuit. Charged intermediates are formed which give up ions to the electrolyte and reduce chemical by-products.

The reactive interfaces

In fuel cells, the direct conversion of chemical energy into electrical energy is accomplished by causing chemical reactions to take place between reactant materials at the junctures or reactive interfaces between spaced electrodes and an intermediae electrolyte, to form a continuous energy exchange system.

The reactants are separately supplied to each juncture so that the charge exchange of the chemical reaction takes place ionically through the ion-conducting electrolyte, which forms the internal circuit; and electronically through the electrodes which form part of the external, power delivery circuit. Thus, where the reactive fuel and oxidant materials are continuously supplied and an electrical load is coupled to the external electron flow circuit, it is possible to electrochemically convert the energy of chemical reaction directly into electrical energy flowing in the external circuit.

By way of example, where hydrogen is employed as one of the reactants and oxygen as the other, the oxidation and reduction of these reactants respectively at the corresponding junctures or interfaces between the electrodes and the electrolyte, generates electricity in the external circuit and water as a by-product of reaction. When each of the materials is continuously supplied and consumed within such an apparatus, it may be likened, respectively, to a fuel, and to an antifuel, the former of which is selected to yield electrons in its chemical reaction and the latter of which is selected to accept electrons in its chemical reaction.

Stability of reactants

For this electrochemical reaction, the fuel and antifuel or oxidant are supplied in a relatively stable state and some means is required for enhancing the conversion of these materials from their normally stable state over to the reaction product state, with the concommitant release of elecrical energy.

The problem

Due to the stability of the reactants, the conversion of the fuel and oxidant is not practically self-motivating. To initiate and maintain peak performance some means must be employed to initiate the reaction.

The prior art has attempted to employ selected electrode materials in an effort to create and maintain optimum operating conditions. Also the prior art has employed materials such as platinum dispersed on a carbon surface which have been variously termed electrode "catalysts" or electrode "activators" in the jargon of the technology. Such materials tend to catalytically enhance the adsorption of reactants on the electrodes, but this is only the first step of the involved process.

There are further steps of the process that the prior art has not contemplated. Thus in a second step the electron transfer should occur under balanced potential conditions in order to take place in the most favorable energy situation. Further in a third step the desorption of by-products should occur in a chemical environment different from that of the substrate electrode.

Advance to the art

Therefore a substantial advance to the art would be provided by a fuel cell system wherein electron release from the fuel and oxidant at their respective electrode interfaces would be substantially enhanced for greater efficiency of the cell, by incorporating intermediate electron transfer species into the system which more rapidly react with the fuel and antifuel, and enhance the transfer of electrons from fuel to the anode and from the cathode to the antifuel. A means must be provided to prevent the intermediate electron transfer species for the fuel from contacting the cathode, and similarly for the intermediate electron transfer species of the antifuel from contacting the anode.

Objects

It is accordingly an important object of the present invention to provide improved fuel cells.

A further object is to provide improved fuel cells wherein an intermediate electron transfer species is provided as a redox system soluble in the electrolyte.

A further object is to provide improved fuel cells employing an intermediate electron transfer species as a solid state material bound to the electrode.

A further object is to provide improved fuel cells wherein an intermediate electron transfer species is provided as a colloidal dispersion of solid redox system in the electrolyte.

A still further object is to provide a balanced rate of reaction between the reactant subsystems of a fuel cell.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Definitions for purpose of this description

For purposes of this description, the apparatus and method for accomplishing the direct conversion of chemical energy into electrical energy will be identified in connection with a fuel cell. The electrical conductors will be identified as electrodes and more specifically as the anode and cathode, respectively, depending upon whether the fuel or oxidant side of the cell is designated. The fuel will be identified as any substance which is oxidizable relative to the oxidant. The antifuel or oxidant will be identified as any substance that is reducible relative to the fuel. The foregoing definitions are contemplated where oxidation and reduction, respectively, involve the release and acceptance of electrons in an electrochemical fuel cell reaction.

For purposes of further definition, a medium which is capable of conducting an electrical charge associated with an atom or group of atoms, i.e., ions, will be referred to as an ion-conducting medium or electrolyte. The electrolyte serves to isolate the electrodes from one another in the internal circuit.

The junctures between the electrodes and the electrolyte will be identified throughout as the reaction interfaces.

The activating means for promoting the conversion of the fuel and oxidant from the reactant state to the product state will be identified as the intermediate electron transfer species.

The overall reaction will be referred to as an electrochemical reaction.

Increased efficiency

From the foregoing and from the following description, it will be understood that a fuel cell reaction constitutes a system comprising a relatively oxidizable subsystem and a relatively reducible subsystem, arranged for electrochemical coaction across an ion-transfer medium. In accordance with the present invention, the efficiency of such a system is increased by increasing the rate at which the reactants are converted for the release of electrical energy therefrom. Further, the efficiency is increased by balancing the rate of reaction between the subsystems, or said in other words, by matching the subsystems in a manner such that their energy outputs are substantially equivalent.

By the present invention, the overall efficiency of the system is improved in a number of ways. These include the following:

(1) Using a cooperating pair of solid state intermediate electron transfer species to enhance electron release from the fuel and oxidant.

(2) Matching the subsystems to one another by means of selected intermediate electron transfer species in the electrolyte to enhance the desorption of ions from the reaction interfaces into the electrolyte and simultaneously match the standard electrode potentials of the reacting components.

(3) Physically matching the subsystems to one another.

(4) Isolating the subsystems in a manner to insure that primary reactions take place at the respective reactive interfaces to provide substantially self-contained subsystems. Thus, the subsystems will be in effect self-contained and isolated from one another so that activation of the fuel and antifuel occurs at the respective reaction interfaces.

Also, the efficiency of operation is improved by employing respective subsystem electron transfer species that have common anion portions.

In view of the foregoing, it is to be understood that the rate of reaction of a fuel cell is increased without changing the relative physical size and quantity of the reactant surfaces and materials. However, improvement can also be provided in accordance with the principles of the present invention by physically adjusting the relative sizes of the reactive interfaces with respect to one another, and the quantities of the reactant materials furnished to the reactive interfaces.

In accordance with the invention, the electrode subsystems are suitably isolated from one another by an electrolyte. In an extension of the invention, the subsystems can be further isolated from one another by a selective ion-permeable barrier. The use of a selective ion-permeable barrier makes it possible to use liquid phase electron transfer species which are respectively selected for optimum coaction with a fuel or oxidant, but may be chemically incompatible with one another.

Figure 1:
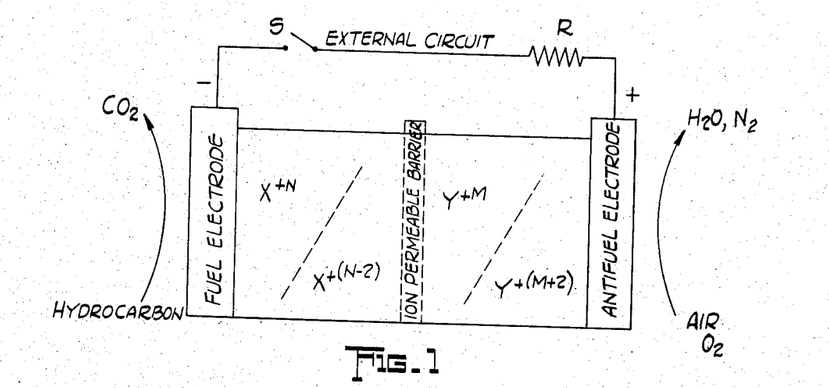
FIGURE 1 is a schematic illustration of a fuel cell embodying the principles of the present invention.

The embodiment of FIGURE 1

With more particular reference to FIGURE 1, there is shown in diagrammatic form a fuel cell having a fuel electrode and an antifuel electrode spaced apart and constituting parts of an external circuit having a switch S and a resistance R therein. The internal circuit is an ion-containing and conducting medium which isolates the two electrodes from one another. In the apparatus shown in FIGURE 1 a hydrocarbon is employed as the fuel, and air or oxygen is employed as the antifuel.

In the embodiment shown in FIGURE 1, separate ion-containing and transfer media are selectively employed for each subsystem, and an ion-permeable barrier is employed to prevent undesirable interaction between the two media. It is to be understood however that a common ion-containing and conducting medium may be employed, in which case the ion-permeable barrier would be unnecessary.

Aqueous intermediate electron transfer species

In the embodiment shown in FIGURE 1, X represents a metal ion which has an oxidized valence of N and a reduced valence of $N-2$, and Y represents a metal ion which has an oxidized valence of $M+2$ and a reduced valence of M. Both forms of X and Y are capable of existing in aqueous solution in order to promote electron transfer at the reactive interfaces.

The general reactions for the respective subsystems of FIGURE 1 may be expressed as follows:

$$H_2 + X^{+N} \rightarrow 2H^+ + X^{+(N-2)}$$

$$2H^+ + \tfrac{1}{2}O_2 + Y^{+M} \rightarrow H_2O + Y^{+(M+2)}$$

It is to be noted that an ion-permeable barrier is interposed between the electrolyte subsystems of the embodiment of FIGURE 1. This prevents intermixture of the X metal ions with the Y metal ions, but makes it possible for hydrogen ions to travel through the ion-permeable barrier and couple with oxygen ions and produce water as a by-product from the antifuel electrode. It also makes it possible for oxygen ions to travel through the ion-permeable barrier to the fuel electrode and produce carbon dioxide as a by-product from the fuel electrode reaction.

Figure 2:
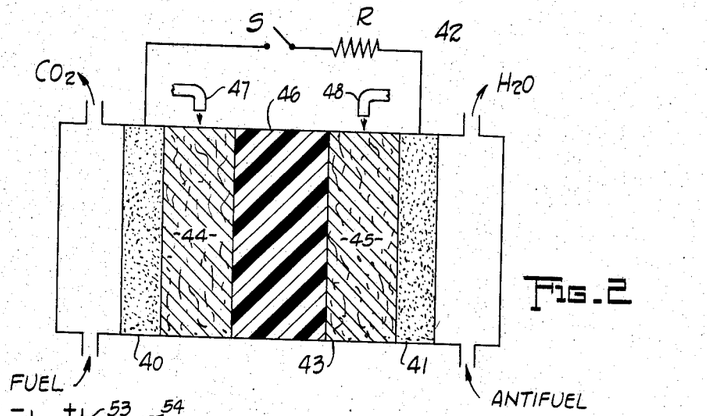
FIGURE 2 is a schematic illustration of a preferred embodiment of a fuel cell embodying the principles of the present invention.

The embodiment of FIGURE 2

In FIGURE 2, there is shown an embodiment of a fuel cell utilizing the principles of FIGURE 1. This embodiment may be extremely thin, thereby enabling stacking of a plurality of complete cell units in a relatively small volume. There is provided a fuel electrode 40 and an antifuel electrode 41, which electrodes may conveniently be made of porous graphite.

An external circuit 42 is provided which joins the electrodes 40 and 41 electronically through a switch S and a load R. Electrodes 40 and 41 are insulated from one another by an electrolyte generally indicated at 43, which in the preferred embodiment shown in FIGURE 2 comprises two subsystems. One is a relatively oxidizable subsystem 44 and the other is a relatively reducible subsystem 45. Each of these electrolyte subsystems includes, in aqueous solution, an intermediate electron transfer species. One is for the fuel side of the cell. This is matched to a different but suitable electron transfer species for the oxidant side of the cell.

In this embodiment of the invention, initial activation of the fuel and oxidant is effected by the surface characteristics of the porous electrode. In this case, porous carbon is used for the electrodes.

Since the intermediate electron transfer species for the fuel and oxidant may be chemically incompatible, it is desirable to provide an ion-permeable barrier 46 which serves to chemically isolate the electrolyte subsystems, but selectively permits the transfer of ions which are involved in the electrochemical reaction of the cell, between the electrodes. The membrane 46 as shown in FIGURE 2 may actually be very thin and may be of either the cation-exchange type or the anion-exchange type.

Since the subsystems 44 and 45 include aqueous solutions, it is desirable to provide some physical container for the unit. In the particular embodiment shown in FIGURE 2, the aqueous solutions are supported on filter papers by saturation. A conduit 47 is provided for supplying an aqueous solution of stannous chloride, for example, to the filter paper in the subsystem 44, and a conduit 48 is provided for supplying an aqueous solution of thallium nitrate ot the filter paper of the subsystem 45.

The principle of the present invention provides that the standard electrode potentials of the respective intermediate electron transfer species shall be matched to within ±.15 volt of the standard electrode potentials of the fuel and oxidant.

EXAMPLE I

Applying this principle, it will be understood that stannous chloride as an intermediate electron transfer species for the fuel subsystem of the embodiment of FIGURE 2 has a standard electrode potential of approximately .15 volt. Hydrogen, to which it is matched, as derived from the hydrocarbon fuel, has a standard electrode potential of .17 volt. The difference between the standard electrode potentials of hydrogen and tin, therefore, is .02 volt, or well within the ±.15 volt range set forth. Thus, a very close match is provided in this instance.

In the oxidant subsystem, thallium ion is used. This has a standard electrode potential of 1.21 volts and very closely approaches the 1.23 volt standard electrode potential of oxygen as derived from the oxidant, such as oxygen from air. The difference between the standard electrode potential of oxygen and thallium therefore is .02 volt or well within the ±.15 volt range set forth.

In this embodiment of the invention the ion-permeable membrane 46 is preferably of the cation-exchange type.

In an actual apparatus made in accordance with FIGURE 2, electric power was produced at 5 milliwatts per square centimeter at a maximum of 1.04 volts and at a current density of 15 amperes per square foot. The fuel used in this actual apparatus was ethane and the oxidant was air.

The cell illustrated in FIGURE 2 can be operated at room temperature.

EXAMPLE II

Another example of a fuel cell system providing a potential match within the scope of the invention is as follows, using one molar aqueous acid as electrolyte.

| Fuel Side | Oxidant Side |
|---|---|
| Fuel: Butylene. Hydrogen reduction potential=.17 volt. Species: Sn+2, Sn+4. Species reduction potential=.15 volt. Match=.02 volt. | Oxidant: Air. Oxygen reduction potential=1.23 volt. Species: Tl+, Tl+3. Species reduction potential=1.21 volts. Match=.02 volt. |

Other systems within the scope of the invention can include pairs of species selected from the following table:

| Fuel Side (H) | Oxidant Side (oxygen) |
|---|---|
| Reduction potential of H=.17 volt. Mated couples: Bi, BiOCl=.16 volt. Sn+, Sn+4=.15 volt. | Reduction potential of O2, 0-= 1.23 volts. Mated couple: Tl+, Tl+3=1.21 volts. |

In addition to the foregoing, cationic portions of the intermediate electron transfer species for the fuel include titanic-titanous and cupric-cuprous, and bismuth(+3)-bismuth(+2).

In addition to the foregoing, cationic portions of the intermediate electron transfer species for the oxidant can include chromic-chromous, manganic-manganous, cobaltic-cobaltous and ceric-cerous. Additionally, cations of Grop IB from the Periodic Table can be used.

Recap

The above principles can be further elaborated upon as follows:

To obtain maximum efficiency of a cell it is necessary that the redox potentials of the anodic and cathodic intermediate electron transfer species be matched as closely as possible to the oxidizing agent (oxygen) and the reducing agent (hydrocarbon or hydrogen) respectively.

The anionic components

Anions which can be associated with the above l'sted cations to form in an aqueous medium the intermediate electron transfer species in accordance with the present invention, include those capable of confering aqueous solubility to the cations to the extent of 0.1 to 4 molar, or more. These include anions derived from mineral acids. The pH of the media can be on either the acidic or basic side, and can be different on opposite sides of the ion-permeable barrier. We prefer however that the pH be the same in each medium to minimize the possibility of exchange through the ion-permeable barrier.

The common anion principle

It has further been found that interdiffusion of cationic portions across the ion-permeable barrier can be substantially reduced by having the same anionic portion in both subsystem. Thus, in a preferred embodiment of the invention, stannous-stannic chloride was used on one side as the intermediate ion transfer species for the fuel and thallic-thallous chloride was used on the oxidant side. Each of these chlorides was used in aqueous hydrochloric acid.

The third embodiment of the invention

Figure 3:
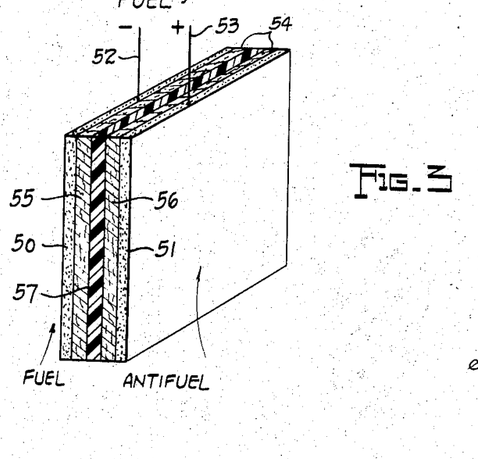
FIGURE 3 illustrates another embodiment of a fuel cell employing the principles of the present invention.

In FIGURE 3 of the drawings, there is illustrated a fuel cell embodying the principles of this invention and in which the common anion principles is utilized. Chloride ions are used on each side of the ion-permeable barrier in this embodiment.

The fuel cell shown in FIGURE 3 is of thin laminar configuration and the members 55 and 56 which are used to retain the subsystem electrolytes are conveniently formed of thin porous filter paper. These are saturated with suitable aqueous solutions containing properly matched intermediate electron transfer species. Between the members 55 and 56 is an ion-permeable exchange resin membrane 57. The lamina 55, 56 and 57 constitute an ion-containing and conducting transfer medium generally indicated by the reference numeral 54. Externally of, and in solid-liquid interfacial content with the medium 54 are, respectively, a fuel electrode 50 and an antifuel electrode 51. These suitably are porous graphite plates.

It is to be understood that the electrodes 50 and 51 are connected to an external circuit through leads 52 and 53 which are provided for this purpose. Electrodes 50 and 51 are spaced apart as shown in FIGURE 3 by the ion-containing and transfer medium 54, and are electronically isolated from one another by the ion-permeable exchange resin membrane 57.

In this embodiment of the invention, the support member 55 can be saturated with aqueous stannous chloride, and the porous support 56 can be saturated with aqueous thallium chloride.

While it has been stated above that the use of the same anion for each of the electrode subsystems inhibits the exchange or diffusion of the cationic portions between the electrodes, this exchange may be even further reduced by the use of the ion-permeable separating membrane 57. This membrane is permeable to fuel derived ions or to antifuel derived ions as the case may be. In an acid medium, it is desirable that this ion-permeable membrane be a cation-exchange membrane saturated with water.

Any suitable non-conducting housing means can be provided to contain single or multiple cell units of the type illustrated in FIGURE 3.

Figure 4:
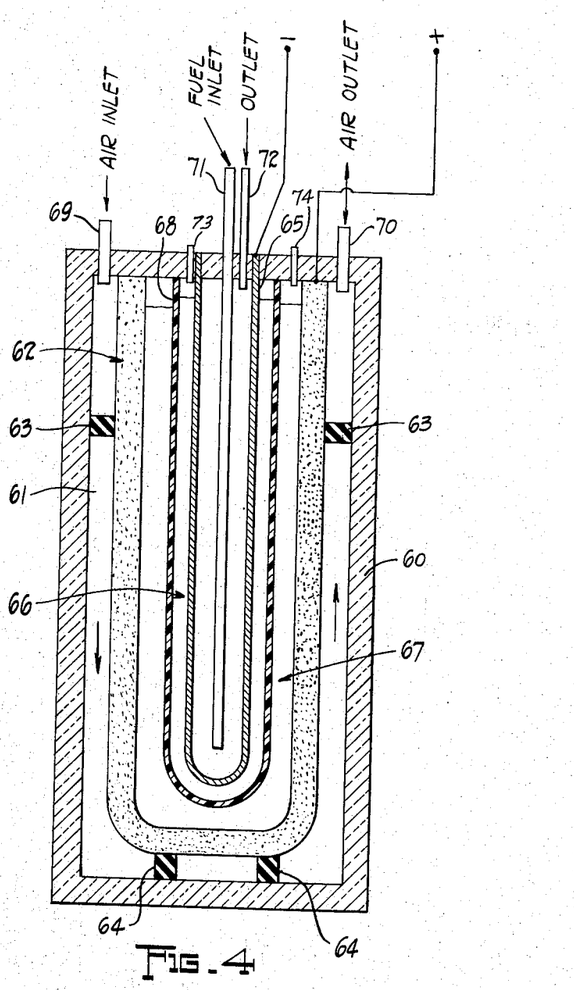
FIGURE 4 illustrates still another embodiment of a fuel cell embodying the present invention.

*Physical size matching of the cell subsystems the embodiment of FIGURE 4*

In this embodiment of the invention, a fuel cell is provided wherein a physical match is obtained between the subsystems by taking into account the differential rates of reaction at the fuel and antifuel electrodes. Where the fuel is hydrogen or hydrogen derived from a hydrocarbon, the reaction rate may be considerably greater than the reaction rate for an oxygen containing antifuel. Hence, in order to further enhance the output of the cell, a substantially greater surface area can be provided for the slower acting subsystem along with a requisite increased supply of reactant.

Accordingly, there is shown in FIGURE 4 a fuel cell body 60 made of a suitably electrically non-conducting material such as rubber, plastic, glass or the like. Spaced from the interior walls of the cell body 60 and defining a peripheral space 61 therewith is a porous graphite electrode 62. Electrode 62 is contacted with the antifuel which in this instance can be air. Suitable spacer members 63 and 64 are provided to retain the electrode 62 in its desired position.

Concentrically disposed within the electrode 62 and spaced therefrom is a thin-walled palladium tube 65 constituting the other electrode of the cell. It is to be understood that the surface area of the thin-walled palladium tube 65 is substantially smaller than the greater surface area of the oxidant electrode 62. This provides a physical balance to account for the differential rates of reaction at the respective electrodes.

In this embodiment of the invention, it is to be understood that aqueous electrolytes can be matched to the fuel and oxidant electrodes. Thus, a suitable intermediate electron transfer species 66, which as a saturated aqueous solution of stannous chloride is provided in contact with the oxidant electrode 65, being retained between that electrode and an ion-permeable barrier member 68 interposed between the electrodes 65 and 62. A suitable matched intermediate electron transfer species 67 can be provided at the other electrode 62. The species 67 may, as previously mentioned, be a saturated aqueous solution of thallium nitrate. This is retained between the ion-permeable barrier 68 and the electrode 62.

It is because of the chemical incompatability of the species 66 and 67 that the ion-permeable barrier 68 is interposed between the two electrode subsystems.

Ports 73 and 74 are provided for supplying and controlling the concentrations of the solution 66 and 67. For purposes of introducing the fuel, an inlet means 71 is provided. An outlet 72 is used to exhaust the fuel by-product, carbon dioxide.

For purposes of introducing the air, an inlet 69 is provided and an outlet 70 is used to exhaust the reaction product, e.g. water.

From the foregoing it will be understood that the fuel cell of FIGURE 4 physically matches the electrode subsystems so that balanced rates are provided in each for improved efficiency. Further, the principle of balancing the free energies of the fuel and antifuel with the free energies of the liquid phase activators is also employed. Relative to this aspect, the rate of reaction at the respective reactive interfaces is enhanced by the provision of metallic ions in solution which are polyvalent and capable of existing in solution in at least two valence states.

By so operating, the quanta of reaction occurring at each of the respective electrode surfaces are balanced to provide maximum utilization of the more reactive fuel with the relatively lesser reactive antifuel, by providing a relatively larger surface area for the slower acting antifuel, and a relatively smaller surface area for the faster acting fuel. In the embodiment of FIGURE 4, a 2:1 ratio of surface area was found to provide extremely efficient operation.

*The solid state aspect of the present invention*

An important aspect of the present invention relates to the conversion of the fuel and oxidant from the reactant state for the release of electrons at the reactant interfaces between the electrodes and the electrolyte. In accordance with this aspect of the invention, solid intermediate electron transfer species are employed which become matched pairs, one on each of the electrodes, and each closely mated to the oxidant or fuel that it serves. By the present invention, solid insoluble materials are employed which include a cation that can exist in two valence states. This produces a fixed bridge-type electron transfer mechanism at the reactive interface.

Materials contemplated for use in the present invention are insoluble and include metals, complex oxides and salts of heteropoly, isopoly and oxy acids wherein the cation or metallic portion of the molecule can exist in the two valence states.

In accordance with this aspect of the invention, it has been discovered that these solid state intermediate electron transfer species, to be effective in improving the efficiency of the cell, must react in some way with either the fuel or oxidant. More particularly, the fuel and oxidant must react with this surface. We have found further that the reaction on the surface is closely related to the thermodynamics or electrochemical redox potential of the transfer species. Within the scope of the invention, the transfer species on the fuel electrode should be substantially insoluble, should be conducting or at least semiconducting, and can consist of a metal oxide, metal oxyhalide, mixed metal oxide, or mixed metal oxyhalide, which accepts two electrons from a reactive hydrocarbon and gives up an oxide ion by the following equation:

Wherein [S] is an oxide ion carrier, and X refers to halogen species.

$M_aM_b'O_xX_y$ is selected by matching to within ±.15 volt the reaction $$C_nH_{2(n+h)} + [S]O^= \rightleftarrows C_nH_{2(n+h)} \cdot O + [S] + 2e^-$$

Examples of $[S]O^= \rightleftarrows [S] + O^=$ are $$H_2O \rightleftarrows 2H^+ + O^=$$
$$H_3PO_4 \rightleftarrows 2H^+ + HPO_3^= + O^=$$
$$Na_2CO_3 \rightleftarrows 2Na^+ + CO_2 + O^=$$

Examples of $M_aM_b'O_xX_y$ are $$Li_xCuO$$
$$BiOCl$$

Examples of $C_nH_{2(n+h)}$ are $H_2$ (n=0) (h=2)    $CH_4$ (n=1) (h=2)    $C_2H_6$, $C_2H_4$ In each case the potential is determined against an oxygen reference system or its equivalent for the following electrochemical reaction:

$$2e^- + \tfrac{1}{2}O_2 + [S] \rightleftarrows [S]O^=$$

It is to be understood that in electrolyte systems in which the oxygen electrode is not reversible, any reference system can be used providing that it is related thermodynamically to the oxygen reference system. It is to be further noted that the oxygen reference system will depend on pH in aqueous systems in exactly the same manner as the reference potential of the reacting hydrocarbon and the transfer species. Hence, the actual measured potential of either system relative to an oxygen or equivalent reference will be independent of pH.

Examples of acceptable electron transfer species for the fuel in accordance with the foregoing principles are set forth in Table III.

TABLE I.—TRANSFER SPECIES WITH REDOX POTENTIALS MATCHING THE FUEL REACTION* $C_2H_6 + 7O^= \rightarrow 2CO_2 + 3H_2O + 14e^-$ WITHIN ±0.15 VOLTS

[$E_T° = -1.08 \pm 0.15$ volts]

| Species | Temp., °K | $E_T°$ |
|---|---|---|
| SnO; SnO$_2$ | 1,000 | −0.985 |
|  | 800 | −1.087 |
|  | 600 | −1.195 |
| WO$_2$; WO$_3$ | 1,000 | −0.978 |
|  | 600 | −1.130 |
|  | 400 | −1.230 |
| Ni; NiO | 600 | −0.955 |
|  | 500 | −1.00 |
|  | 400 | −1.048 |
| Nb$_2$O$_4$; Nb$_2$O$_5$ | 1,000 | −1.190 |
|  | 900 | −1.228 |

*These species match also fuels such as methane, ethylene, propane, propylene, butane, i-butane, butene-1, iso-butene, hexane, cyclohexane and benzene (see Table II.).

TABLE II.—STANDARD POTENTIALS OF VARIOUS HYDROCARBONS AS A FUNCTION OF TEMPERATURE

| Hydrocarbons | Potential (volts) | | | | | |
|---|---|---|---|---|---|---|
|  | Products $CO_2+H_2O$ | | | Products $CO+H_2O$ | | |
|  | Temp. °K. | | | | | |
|  | 298° | 800° | 1,200° | 298° | 800° | 1,200° |
| Methane | −1.04 | −1.04 | −1.04 | −0.94 | −1.01 | −1.07 |
| Ethane | −1.07 | −1.09 | −1.10 | −0.96 | −1.08 | −1.17 |
| Ethylene | −1.14 | −1.13 | −1.11 | −0.96 | −1.13 | −1.21 |
| Propane | −1.18 | −1.10 | −1.12 | −1.04 | −1.10 | −1.21 |
| Propylene | −1.11 | −1.12 | −1.12 | −0.97 | −1.13 | −1.23 |
| n-Butane | −1.08 | −1.11 | −1.14 | −0.97 | −1.11 | −1.23 |
| i-Butane | −1.07 | −1.11 | −1.14 | −0.96 | −1.11 | −1.24 |
| Butene-1 | −1.11 | −1.12 | −1.27 | −0.99 | −1.13 | −1.24 |
| i-Butene | −1.10 | −1.12 | −1.13 | −0.98 | −1.13 | −1.32 |
| n-Hexane | −1.08 | −1.13 | −1.15 | −0.97 | −1.13 | −1.24 |
| Cyclohexane | −1.08 | −1.13 | −1.16 | −0.96 | −1.14 | −1.25 |
| Benzene | −1.10 | −1.11 | −1.11 | −0.94 | −1.11 | −1.24 |

Note that the standard potentials of the various hydrocarbons are very similar and change but slightly with temperature.

*Determining potential*

The potentials for these intermediate electron transfer species systems are found as follows: The free energy of formation of the stochiometric metal oxides on both sides of the non-stochiometric compound are calculated. The difference between the two free energies is ascertained, and is divided by two times the Faraday's constant for the two electron transfer process. This gives the potential to an oxygen reference.

Examples of electron transfer species are shown in Tables I, III and IV.

TABLE III.—TRANSFER SPECIES WITH REDOX POTENTIALS MATCHING THE FUEL REACTION $C_2H_6 + O^- \rightarrow C_2H_5OH + 2e^-$ WITHIN ±0.15 VOLT

[$E_T° = -0.745 \pm 0.15$ volt]

| Species | Temp., °K. | $E_T°$ |
|---|---|---|
| Sb$_2$O$_3$; Sb$_2$O$_4$ | 500 | −0.606 |
|  | 400 | −0.658 |
|  | 298 | −0.705 |
| MnO; Mn$_2$O$_3$ | 400 | −0.609 |
|  | 298 | −0.80 |
| MnO; Mn$_3$O$_4$ | 800 | −0.650 |
|  | 700 | −0.721 |
|  | 600 | −0.781 |
| MoO$_2$; MoO$_3$ | 900 | −0.630 |
|  | 700 | −0.725 |
|  | 600 | −0.800 |
| Fe$_3$O$_4$; Fe$_2$O$_3$ | 800 | −0.652 |
|  | 700 | −0.738 |
|  | 600 | −0.798 |
| V$_2$O$_3$; V$_2$O$_4$ | 900 | −0.619 |
|  | 500 | −0.773 |
| BiO; Bi$_2$O$_3$ | 500 | −0.604 |
|  | 298 | −0.689 |
| UO$_2$; U$_3$O$_8$ | 500 | −0.606 |

TABLE IV.—TRANSFER SPECIES WITH REDOX POTENTIALS MATCHING THE FUEL REACTION $C_2H_4 + O^- \rightarrow C_2H_4O + 2e^-$ WITHIN ±0.15 VOLT

[$E_T° = -0.99 \pm 0.15$ volt]

| Species | Temp., °K. | $E_T°$ |
|---|---|---|
| SnO; SnO$_2$ | 1,000 | −0.985 |
|  | 900 | −1.034 |
|  | 800 | −1.087 |
|  | 700 | −1.140 |
| WO$_2$; WO$_3$ | 1,000 | −0.978 |
|  | 700 | −1.010 |
|  | 600 | −1.130 |
| Ni; NiO | 800 | −0.864 |
|  | 600 | −0.955 |
|  | 400 | −1.048 |

*Oxygen transfer species*

In order to serve as a suitable intermediate electron transfer species for the conversion of oxygen at the reactive interface, the oxygen system must have a potential within ±.15 volt of the oxygen reference in order to be satisfactory for a four electron reversible reaction. Whether or not the species is applicable, can be ascertained by analagous calculations carried out relative to the fuel species.

Again, the species must be of the same type as described for use with the fuel electrode, that is conducting or semi-conducting, insoluble oxides, oxyhalides or mixed metal oxides or oxyhalides.

In the case of a reversible oxygen electrode, the reaction is of the type:

$$2[S]O^- + 2M_aM_b'O_{x-1}X_y \underset{}{\overset{E_1}{\rightleftarrows}} 2M_aM_b'O_xX_y + 4e^- + [S]$$

$$4e^- + O_2 + 2[S] \underset{}{\overset{E_2}{\rightleftarrows}} 2[S]O^-$$

Examples of suitable species are shown in Table V.

TABLE V.—TRANSFER SPECIES WITH REDOX POTENTIALS MATCHING THE OXIDATION REACTION $O_2+4e^-\rightarrow O^=$ WITHIN $\pm 0.15$ VOLT

[$E_T°=0.0\pm0.15$ volt]

| Species | Temp., °K. | $E_T°$ |
|---|---|---|
| PbO; Pb$_3$O$_4$ | 1,000 | +0.069 |
|  | 900 | +0.017 |
|  | 800 | −0.039 |
|  | 700 | −0.061 |
|  | 600 | 0.124 |
| Pb$_3$O$_4$; PbO$_2$ | 800 | +0.133 |
|  | 700 | +0.087 |
|  | 600 | +0.040 |
|  | 500 | −0.002 |
|  | 400 | −0.054 |
|  | 298 | −0.103 |
| PbO; PbO$_2$ | 900 | +0.126 |
|  | 800 | +0.076 |
|  | 700 | +0.032 |
|  | 600 | −0.015 |
|  | 500 | −0.063 |
|  | 400 | −0.106 |
| U$_3$O$_8$; UO$_3$ | 900 | −0.078 |
|  | 800 | −0.128 |
| Re$_2$O$_7$; Re$_2$O$_8$ | 600 | −0.0 |
|  | 500 | −0.022 |
|  | 400 | −0.054 |
|  | 298 | −0.108 |
| 2 RhO; Rh$_2$O$_3$ | 1,000 | −0.022 |
|  | 900 | −0.054 |
|  | 800 | −0.108 |
| Cr$_2$O$_3$; CrO$_2$ | 500 | −0.059 |

*Peroxide intermediate*

In case the oxygen reacts to a peroxide intermediate, the potential must match the reaction $$2e^- + O_2 + [S] \rightleftarrows [S]O_2^=$$

The standard potential for this reaction is found relative to the $O_2$ electrode in a manner analogous to the fuel transfer species. For example, in aqueous 1 N acid, the reaction is $$2e^- + O_2 + 2H^+ \rightleftarrows H_2O_2$$

The potential relative to the NHE for this system is 0.68 volt, or the potential relative to oxygen is −0.55 volt. Examples are given in Table VI.

It has been found that transfer species outside these limits would either react at such a slow rate that the fuel cell will not supply significant amounts of current or at the other extreme, the operating voltages are significantly lower with considerable loss of efficiency.

TABLE VI.—TRANSFER SPECIES WITH REDOX POTENTIALS MATCHING THE OXIDATION REACTION $O_2+2H^++2e^-\rightarrow H_2O_2$ WITHIN $\pm 0.15$ VOLT

[$E_T°=-0.55\pm0.15$ volt]

| Species | Temp., °K. | $E_T°$ |
|---|---|---|
| V$_2$O$_4$; V$_2$O$_5$ | 600 | −0.414 |
|  | 500 | −0.450 |
|  | 298 | −0.550 |
| V$_2$O$_3$; V$_2$O$_4$ | 1,000 | −0.580 |
|  | 700 | −0.688 |
| Sb$_2$O$_3$; Sb$_2$O$_4$ | 900 | −0.409 |
|  | 800 | −0.458 |
|  | 700 | −0.516 |
|  | 400 | −0.658 |
| Sb$_2$O$_3$; Sb$_2$O$_5$ | 400 | −0.437 |
| MoO$_2$; MoO$_3$ | 1,000 | −0.584 |
|  | 800 | −0.679 |
| Cu$_2$O; CuO | 600 | −0.400 |
|  | 500 | −0.477 |
|  | 298 | −0.569 |
| MnO; MnO$_2$ | 500 | −0.421 |
|  | 298 | −0.534 |
| MnO; Mn$_2$O$_3$ | 700 | −0.447 |
|  | 500 | −0.565 |
|  | 400 | −0.609 |
| Cu; Cu$_2$O | 1,200 | −0.449 |
|  | 800 | −0.584 |
|  | 600 | −0.659 |
| BiO; Bi$_2$O$_3$ | 900 | −0.423 |
|  | 800 | −0.485 |
|  | 700 | −0.521 |
|  | 600 | −0.566 |
|  | 500 | −0.504 |
| CoO; Co$_3$O$_4$ | 500 | −0.464 |
|  | 298 | −0.590 |
| UO$_2$; U$_3$O$_8$ | 1,000 | −0.400 |
|  | 700 | −0.530 |
|  | 500 | −0.606 |

*Typical electrode reactions*

Typical illustrative electrode reactions in accordance with the foregoing principles are as follows: For the fuel electrode having a solid intermediate electron transfer species deposited on the surfaces thereof by any suitable technique such as plasma jet spraying, and with hydrogen as the fuel, the overall reaction can be represented as follows:

$$Sb_2O_3 + H_2 \rightarrow 2Sb + 3H_2O$$

$$2Sb + 3H_2O \rightarrow Sb_2O_3 + 6H^+ + 6e^-$$

At the antifuel electrode, the overall reaction using solid Tl$_3$PO$_4$ as the transfer species in phosphoric acid solution would be represented as follows:

$$Tl_3PO_4 + 2H_3PO_4 + 3O_2 \rightarrow 3TlPO_4 + 3H_2O$$

$$3TlPO_4 + 6H^+ + 6e^- \rightarrow Tl_3PO_4 + 2H_3PO_4$$

*The anionic portions of the solid state intermediate electron transfer species; the use of complete, relatively immobile anions*

Since the solid state intermediate electron transfer species of the present invention work most efficiently when kept separated from one another it is preferred to use large, relatively immobile anions. Thus, the anions may be those derived from isopolyacids, heteropolyacids and oxyacids. Thus anions of phosphoric acid, polyphosphoric acid, chromic acid, boric acid, sulfuric acid, phosphomolybdic acid, phosphotungstic acid, molybdosilicic, molybdoarsenic acid, tungstoboric acid, polymolybdic acid, polytungstic acid, molybdotelluric acid, polyvanadic acid, polyarsenic acid, vanadic acid, molybdic acid, tungstic acid etc. can be used.

Salts of heteropoly acids: Because of the large and complex nature of anionic portion of the salt of a heteropoly acid, it is at present difficult to ascertain precisely what the oxidation potentials of the individual cations will be in the vicinity of these complex anions. Therefore, it is thought that cations of Groups IB, IIB, IIIB, IVB, VB, VIII and rare earth elements may be used.

The anionic portions of these salts should be those which contain as the central of hetero atom, P, Si, B, As, Ti, Ge, Sn, Zr, Hs, Th, Ce, I, Te, Fe, Cr, Al, Co, Ni, Rh, Cu, and Mn and oxides of Mo, W, V, and Cr. An example would be Tl$_3$PMo$_{12}$O$_{40}$·xH$_2$O.

Salts of isopoly acids: The cationic portions of these salts should be the same as those enumerated above. The anionic portions can be those of polychromic, polymolybdic, polyvanadic, polyarsenic, polyboric, polytungstic, or polyphosphoric acids. An example is tellurium polymolybdate.

Salts of oxy acids: The cationic portions of these salts again would be the same as set out above. The anionic portions include those of phosphoric, chromic, molybdic, vanadic, tungstic, boric or sulfuric acids. An example is Tl$_3$PO$_4$—Tl$_4$P$_2$O$_7$.

The salts used in the different subsystems need not be exact stoichiometric salts; thus, higher and lower ratios of salting metal oxides can be used.

Also, the salts need not have all of the acid hydrogen of the parent acid replaced by the potentially matching cations, that is, they may be acid salts.

The salts discussed above are fairly complex molecules in which the anionic portions are large and would move very slowly by diffusion. Thus, interdiffusion of the cations between the electrodes will be minimized. Further, these materials are not volatile and will not be lost if it is desirable to operate cells at elevated temperatures. Also, from the great variety of these salts that are available, optimum compositions are available for a specific fuel cell operation. (i.e., consider solubilities, acidities, and lattice energies of the individual salts to minimize activation energies).

Utility of the solid intermediate electron transfer species

The solid species can be applied to electrodes by chemical or physical deposition when porous metallic or porous carbon electrodes are used. Also, application can be made by flame spraying where solid metallic electrodes are used. Tin oxide for the fuel electrode and thallium oxide for the antifuel electrode can be deposited by plasma jet spraying for satisfactory operation in accordance with the present invention.

As a general rule, in matching the potentials of the solid transfer species to the potentials of the fuel and antifuel respectively, the oxidation-reduction potential of the fuel transfer species is preferably slightly higher (more positive) than that of the fuel. The oxidation-reduction potential of the antifuel transfer species is preferably slightly lower (less positive) than that of the antifuel. The magnitude of the potential difference should be within the limits of ±.15 volt. It will be understood that certain substantially exact matches can be made within the above range.

Figure 5:
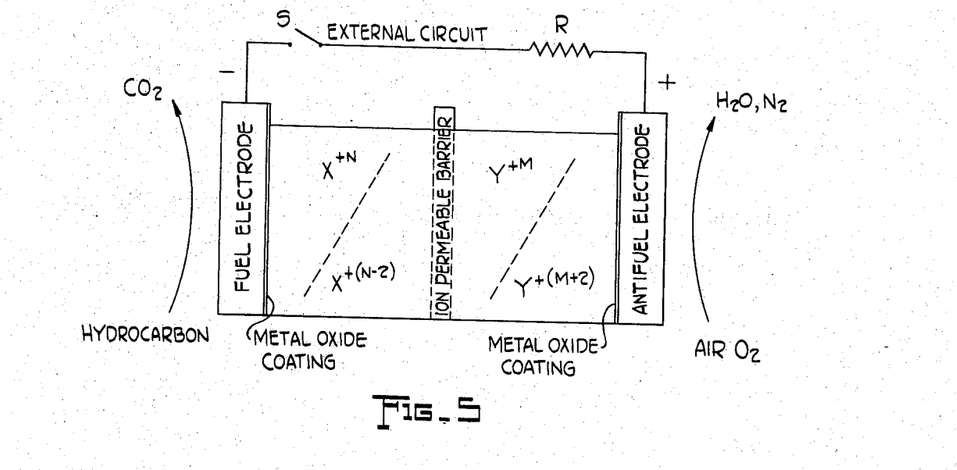
FIGURE 5 is a schematic illustration of a further fuel cell system embodying the principles of the present invention.

The embodiment of FIGURE 5; application of the principles of solid state intermediate electron transfer species In FIGURE 5, electrodes are illustrated as being provided on the internal surface with metal oxide coatings. The electrolyte is a two-phase system, similar to that described relative to FIGURE 1, using an ion-permeable barrier therebetween. The purpose of the solid oxide coatings is to enhance the conversion of the fuel and oxidant at the reaction interfaces in accordance with the principles set forth above.

In addition to metal oxide coatings, the various insoluble metal salts of the various acids of the type disclosed can also be used to enhance the electrochemical reaction. Within the scope of the invention, the solid state transfer species and the liquid phase transfer species can be used together as shown in FIGURE 5, or separately as shown in FIGURE 1.

Figure 6:
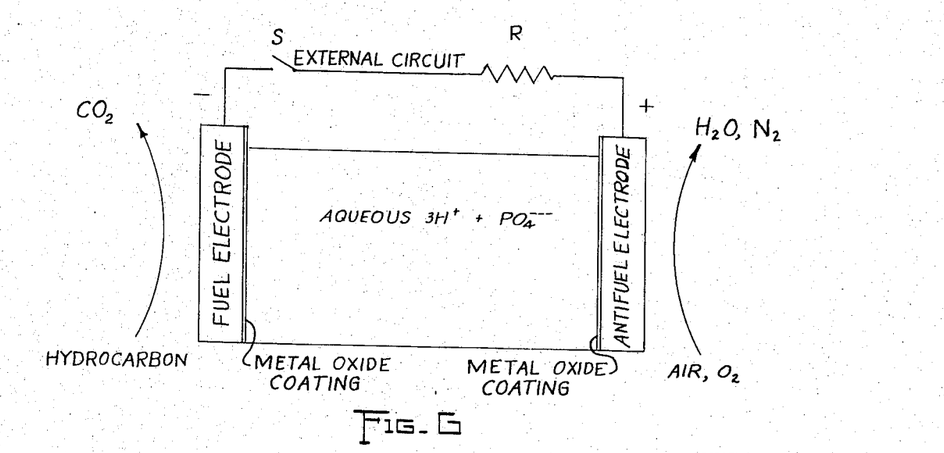
FIGURE 6 is a schematic illustration of a fuel cell system embodying the solid state principles of the present invention per se.

The embodiment of FIGURE 6; the pure solid state species embodiment

This embodiment forms a very important aspect of the invention and provides a very substantial contribution to the prior art. Thus, conversion of the fuel and oxidant reactants for electron transfer at the reactive interfaces between the electrodes and the electrolyte is considerably enhanced to thereby speed the rate of energy release that takes place within the cell. By the present invention a separate solid state intermediate electron transfer species is used on each electrode. However, in accordance with the principles of the invention, the two materials cooperate as a pair, each being respectively closely matched to the characteristics of the fuel and oxidant in order not only to provide increased rate of energy release therefrom, but also to balance them against one another to form a stable and highly efficient cell function.

In this aspect of the invention, it is not mandatory that the electrolyte contain intermediate electron transfer species. For example, in this embodiment of the invention, an aqueous solution of phosphoric acid can serve as the sole electrolyte medium, disposed between the electrodes. Therefore, enhanced output by this embodiment of the invention is due solely to the metal oxide, metal oxyhalide, mixed metal oxide or mixed metal oxyhalide, whichever is utilized, in insoluble form on the electrode surfaces in the manner previously described. Thus, in this embodiment of the invention, there is no reliance upon any control or enhancement of the reaction by means of additives placed in the electrolyte. Accordingly, reaction enhancement is produced solely between the solid coating agent and the electrode surfaces.

The electrodes shown in FIGURE 6, as well as those shown in FIGURE 5, may be composed of porous graphite or porous, sintered metal having deposited on the reaction surface thereof, that is the interior surface relative to the cell, a coating of an electrically conductive metal oxide, metal oxyhalide, mixed metal oxide, or mixed metal oxyhalide, in accordance with the principles set out hereinbefore. Within the scope of invention encompassed by these principles, the intermediate electron transfer species can be plated onto an electrode such as porous carbon. Further, in accordance with the invention, a mixture of metal and a solid transfer species can be compressed in powder form and sintered to produce a porous electrode. Thus, composite compositions in the form of electrodes are encompassed within the scope of the present invention.

No ion-permeable barrier is required in this system.

From the foregoing it will be evident, in accordance with FIGURE 6 of the drawings, that there is provided in accordance with the principles of this invention, an electrochemical reaction apparatus in which the electrodes include solid intermediate electron transfer species, that is complex metal oxides or the like, rendered electrically conductive as by suitable additives, and separated by an electrolyte such as phosphoric acid.

The insoluble, solid state coatings are rendered conductive in one method of procedure by being deposited as very thin coatings or films on a more conductive metallic or carbon substrate, in which case the conductivity of the substrate will suffice. When used as thicker coatings or when used on nonconductive substrates, the solid state species can be rendered semi-conducting by including minor amounts of certain additives as for example a small amount of lithium diffused into the system or by introducing anion defects, as for example non-stoichiometric oxides. Also, nickel, boron, germanium, cadmium and other selected metals of small cation size will diffuse into the system, and can be employed to impart appropriate conductivity. For example, in the case of $UO_{2.5-2.9}$ this would yield a compound of the formula $Li_xUO_{2.5-2.9}$. Of course, the electrolyte system and the crystal structure must provide an insoluble electron transfer species. Another example of a lithium-diffused activator is $Li_xCu_2O_{1.5}$ which has a potential of +0.345 v. relative to a normal hydrogen electrode.

Illustrative examples include the use of nickel or boron in a $V_2O_4$ coating. Germanium metal could be used in a $V_2O_5$ coating. In a $Se_2O_3$ coating, cadmium and lithium could be employed.

Within the scope of the invention the solid state intermediate electron transfer species can be used in suspension in the electrolyte. For this application they are prepared in finely divided form and dispersed in the electrolyte adjacent to the respective electrodes. In this aspect of the invention a porous membrane functioning in the nature of a filter would be used. This keeps the different species for each electrode from interdiffusing.

Summary

From the foregoing it will be evident that fuel cells of improved efficiency have been provided by employing the principles of the present invention. Faster rates of release of electrical energy are provided; losses resulting from failure to utilize available free energy of the reacting components are reduced; and rates of respective electrode reactions are balanced within careful limits. The principles of the present invention arise from carefully matched solid state intermediate electron transfer species deposited on the electrodes, and from carefully matched water-soluble, ionized transfer species in the electrolyte system. Further, efficiency is provided by matching the oxidation-reduction potentials of both the solid state species and the liquid state species to those of the reactant materials.

Still further, fuel cell efficiency is enhanced by the presence of common anions in a multiple subsystem liquid electrolyte. Still further, physical matching can be utilized for adjusting the relative sizes of the electrode surfaces to account for differences in reaction rates and polarization characteristics of the reactants.

Relative to the foregoing, it is to be understood that the action produced by the solid state intermediate electron transfer species on the electrodes is clearly distinguishable from the action produced by the liquid state materials in the electrolyte.

*Extended scope of invention*

It has been mentioned above that solid state electron transfer species can be used for enhancing the conversion of the reactant fuel and oxidant materials from a stable reactant state, for purposes of enhancing electron release. In addition to the foregoing, certain types of metallic deposits can be placed on the electrodes to increase surface area. These tend to expedite the adsorption of a gas onto a solid surface. These of course are distinguishable from the solid state metal oxide-containing electron transfer species, which are closely matched to the reaction potentials of the fuel and oxidant respectively.

In this extended aspect of the invention, the following materials can well be utilized in those instances wherein they are warranted: Finely divided gold, platinum, palladium, nickel, and the like.

We claim:
1. In a process for enhancing the conversion of chemical energy into electrical energy in an electrochemical reaction system having (A) a relatively reducible oxidant subsystem, including (A–1) gaseous oxidant reactant, and (A–2) an electron transfer species; (B) a relatively oxidizable fuel subsystem including (B–1) a gaseous fuel reactant, (B–2) an electron transfer species, said subsystems being electronically isolated from one another by an electrolyte, each of said subsystems including an electrode forming part of an electronic circuit, the electrodes being positioned in spaced relationship to one another and being permeable to said respective gaseous reactants, said electrodes having reactive surfaces including adjacent, spaced, internal surfaces, said liquid electrolyte being disposed in the space between said electrode internal surfaces and forming reactive interfaces at said electrodes, means for supplying a gaseous, reducible oxidant to said oxidation subsystems, means for supplying a gaseous, oxidizable fuel to said fuel subsystem, the steps of matching the oxidation-reduction potential of (A–1) with (A–2) within the range of ±0.15 volt, (A–1) being an oxygen-containg gas having an oxidation-reduction potential of from −0.70 volt to 0.15 volt, and (A–2) being selected from the group consisting of $PbO$, $PbO_2$; $PbO$, $Pb_3O_4$; $Pb_3O_4$, $PbO_2$; $Re_2O_7$, $Re_2O_8$; $2RhO$, $Rh_2O_3$; $Cr_2O_3$, $CrO_2$; $V_2O_4$, $V_2O_5$; $V_2O_3$, $V_2O_4$; $Sb_2O_3$, $Sb_2O_4$; $Sb_2O_3$, $Sb_2O_5$; $MoO_2$, $MoO_3$; $Cu_2O$, $CuO$; $MnO$, $MnO_2$; $MnO$, $Mn_3O_2$; $Cu$, $Cu_2O$; $BiO$, $Bi_2O_3$; and $CoO$, $Co_3O_4$ and chemical and physical combinations and mixtures thereof, and having an oxidation-reduction potential of from substantially −0.838 to 0.283 volt, matching the oxidation-reduction potential of (B–1) with (B–2) within the range of ±0.15 volt, (B–1) being selected from the group consisting of a hydrocarbon of from one to six carbon atoms and hydrogen and having an oxidation-reduction potential of from substantially −1.47 volt to substantially 0.32 volt, and (B–2) being selected from the group consisting of $WO_2$, $WO_3$; $Nb_2O_4$, $Nb_2O_5$; $Sb_2O_3$; $Sb_2O_4$; $MnO$, $Mn_2O_3$; $MnO$, $Mn_3O_4$; $MoO_2$, $MoO_3$; $V_2O_3$, $V_2O_4$; and $BiO$, $Bi_2O_3$ and chemical and physical combinations and mixtures thereof, and having an oxidation-reduction potential of form substantially −0.454 volt to −1.380 volts.

2. In a process for enhancing the conversion of chemical energy into electrical energy in an electrochemical reaction system having (A) a relatively reducible oxidant subsystem, including (A–1) gaseous oxidant reactant, and (A–2) an electron transfer species; (B) a relatively oxidizable fuel subsystem including (B–1) a gaseous fuel reactant, (B–2) an electron transfer species, said subsystems being electronically isolated from one another by an electrolyte, each of said sybsystems including an electrode forming part of an electronic circuit, the electrodes being positioned in spaced relationship to one another and being permeable to said respective gaseous reactants, said electrodes having reactive surfaces including adjacent, spaced, internal surfaces, said liquid electrolyte being disposed in the space between said electrode internal surfaces and forming reactive interfaces at said electrodes, means for supplying a gaseous, reducible oxidant to said oxidation subsystems, means for supplying a gaseous, oxidizable fuel to said fuel subsystem, the steps of matching the oxidation-reduction potential of (A–1) with (A–2) within the range of ±0.15 volt, (A–1) being an oxygen-containing gas having an oxidation-reduction potential of from −0.70 volt to 0.15 volt, and (A–2) being selected from the group consisting of $PbO$, $PbO_2$; $PbO$, $Pb_3O_4$; $Pb_3O_4$, $PbO_2$; $Re_2O_7$, $Re_2O_8$; $2RhO$, $Rh_2O_3$; $Cr_2O_3$, $CrO_2$; $V_2O_4$, $V_2O_5$; $V_2O_3$, $V_2O_4$. $SbO_3$, $Sb_2O_4$; $Sb_2O_3$, $Sb_2O_5$; $MoO_2$, $MoO_3$; $MnO$, $MnO_2$; $MnO$, $MnO_3$; $Cu_2O$, $CuO$; $Cu$, $Cu_2O$; $BiO$, $Bi_2O_3$; and $CoO$, $Co_3O_4$, and chemical and physical combinations and mixtures thereof, and having an oxidation-reduction potential of from substantially −0.838 to 0.283 volt.

matching the oxidation-reduction potential of (B–1) with (B–2) within the range of ±0.15 volt, (B–1) being selected from the group consisting of a hydrocarbon of from one to six carbon atoms and hydrogen and having an oxidation-reduction potential of from substantially −1.47 volt to substantially 0.32 volt, and (B–2) being selected from the group consisting of $WO_2$, $WO_3$; and $Nb_2O_4$, $Nb_2O_5$; and chemical and physical combinations and mixtures thereof, and having an oxidation-reduction potential of from substantially −1.380 volt to substantially −0.805 volt.

3. In a process for enhancing the conversion of chemical energy into electrical energy in an electrochemical reaction system having (A) a relatively reducible oxidant subsystem, including (A–1) gaseous oxidant reactant, and (A–2) an electron transfer species; (B) a relatively oxidizable fuel subsystem including (B–1) a gaseous fuel reactant, (B–2) an electron transfer species, said subsystems being electronically isolated from one another by an electrolyte, each of said subsystems including an electrode forming part of an electronic circuit, the electrodes being positioned in spaced relationship to one another and being permeable to said respective gaseous reactants, said electrodes having reactive surfaces including adjacent, spaced, internal surfaces, said liquid electrolyte being disposed in the space between said electrode internal surfaces and forming reactive interfaces at said electrodes, means for supplying a gaseous, reducible oxidant to said oxidation subsystems, means for supplying a gaseous, oxidizable fuel to said fuel subsystem, the steps of matching the oxidant-reduction potential of (A–1) with (A–2) within the range of ±0.15 volt, (A–1) being an oxygen-containing gas having an oxidation-reduction potential of from −0.70 volt to 0.15 volt, and (A–2) being selected from the group consisting of $PbO$, $PbO_2$; $PbO$, $Pb_3O_4$; $Pb_3O_4$, $PbO_2$; $Re_2O_7$, $Re_2O_8$; $2RhO$, $Rh_2O_3$; $Cr_2O_3$, $CrO_2$; $V_2O_4$, $V_2O_5$; $V_2O_3$, $V_2O_4$; $Sb_2O_3$, $Sb_2O_4$; $Sb_2O_3$, $Sb_2O_5$; $MoO_2$, $MoO_3$; $Cu_2O$, $CuO$; $Cu$, $Cu_2O$; $MnO$, $MnO_2$; $MnO$, $Mn_2O_3$; $BiO$, $Bi_2O_3$; and $CoO$, $Co_3O_4$, and chemical and physical combinations and mixtures thereof, and having an oxidation-reduction potential of from substantially −0.838 to 0.283 volt, matching the oxidation-reduction potential of (B–1) with (B–2) within the range of ±0.15 volt, (B–1) being selected from the group consisting of a hydrocarbon of from one to six carbon atoms and hydrogen and having an oxidation-reduction potential of from substantially —1.47 volt to substantially 0.32 volt, (B–2) being selected from the group consisting of $Sb_2O_3$, $Sb_2O_4$; MnO, $Mn_2O_3$; MnO, $Mn_3O_4$; $MoO_2$, $MoO_3$; $V_2O_3$, $V_2O_4$; and BiO, $Bi_2O_3$, and chemical and physical combinations and mixtures thereof, and having an oxidation-reduction potential of from substantially —0.95 volt to —0.454 volt.

4. In a process for enhancing the conversion of chemical energy into electrical energy in an electrochemical reaction system having (A) a relatively reducible oxidant subsystem, including (A–1) gaseous oxidant reactant, and (A–2) an electron transfer species; (B) a relatively oxidizable fuel subsystem including (B–1) a gaseous fuel reactant, (B–2) an electron transfer species, said subsystems being electronically isolated from one another by an electrolyte, each of said subsystems including an electrode forming part of an electronic circuit, the electrodes being positioned in spaced relationship to one another and being permeable to said respective gaseous reactants, said electrodes having reactive surfaces including adjacent, spaced, internal surfaces, said liquid electrolyte being disposed in the space between said electrode internal surfaces and forming reactive interfaces at said electrodes, means for supplying a gaseous, reducible oxidant to said oxidation subsystems, means for supplying a gaseous, oxidizable fuel to said fuel subsystem, the steps of matching the oxidation-reduction potential of (A–1) with (A–2) within the range of ±0.15 volt, (A–1) being an oxygen-containing gas having an oxidation-reduction potential of from —0.70 volt to 0.15 volt, and (A–2) being selected from the group consisting of PbO, $PbO_2$; PbO, $Pb_3O_4$; $Pb_3O_4$, $PbO_2$; $Re_2O_7$, $Re_2O_8$; $2RhO$, $Rh_2O_3$; $Cr_2O_3$, $CrO_2$; $V_2O_4$, $V_2O_5$; $V_2O_3$, $V_2O_4$; $Sb_2O_3$, $Sb_2O_4$; $Sb_2O_3$, $Sb_2O_5$; $MoO_2$ $MoO_3$; $Cu_2O$, CuO; MnO, $MnO_2$; MnO, $Mn_2O_3$; Cu, $Cu_2O$; BiO, $Bi_2O_3$; and CoO, $Co_3O_4$, and chemical and physical combinations and mixtures thereof, and having an oxidation-reduction potential oxidation-reduction potential of from substantially —0.838 to 0.283 volt, matching the oxidation-reduction potential of (B–1) with (B–2) within the range of ±0.15 volt, (B–1) being selected from the group consisting of a hydrocarbon of from one to six carbon atoms and hydrogen and having an oxidation-reduction potential of from substantially —1.47 volt to substantially 0.32 volt, and (B–2) being $WO_2$, $WO_3$, and having an oxidation-reduction potential of from substantially —1.290 volt to substantially —0.714 volt.

5. In a process for enhancing the conversion of chemical energy into electrical energy in an electrochemical reaction system having (A) a relatively reducible oxidant subsystem, including (A–1) gaseous oxidant reactant, and (A–2) an electron transfer species; (B) a relatively oxidizable fuel subsystem including (B–1) a gaseous fuel reactant, (B–2) an electron transfer species, said subsystems being electronically isolated from one another by an electrolyte, each of said subsystems including an electrode forming part of an electronic circuit, the electrodes being positioned in spaced relationship to one another and being permeable to said respective gaseous reactants, said electrodes having reactive surfaces including adjacent, spaced, internal surfaces, said liquid electrolyte being disposed in the space between said electrode internal surfaces and forming reactive interfaces at said electrodes, means for supplying a gaseous, reducible oxidant to said oxidation subsystems, means for supplying a gaseous, oxidizable fuel to said fuel subsystem, the steps of matching the oxidation-reduction potential of (A–1) with (A–2) within the range of ±0.15 volt, (A–1) being an oxygen-containing gas and (A–2) being selected from the group consisting of PbO, $Pb_3O_4$; $Pb_3O_4$, $PbO_2$; PbO, $PbO_2$; $Re_2O_7$, $Re_2O_8$; $2RhO$, $Rh_2O_3$; and $Cr_2O_3$, $CrO_2$, and chemical and physical combinations and mixtures thereof, and having an oxidation-reduction potential of from substantially —0.278 volt to substantially 0.283 volt, matching the oxidation-reduction potential of (B–1) with (B–2) within the range of ±0.15 volt, (B–1) being selected from the group consisting of a hydrocarbon of from one to six carbon atoms and hydrogen and having an oxidation-reduction potential of from substantially —1.47 volt to substantially 0.32 volt, and (B–2) being selected from the group consisting of $WO_2$, $WO_3$; $Nb_2O_4$, $Nb_2O_5$; $Sb_2O_3$, $Sb_2O_4$; MnO, $Mn_2O_3$; MnO, $Mn_3O_4$; $MoO_2$, $MoO_3$; $V_2O_3$, $V_2O_4$ and BiO, $Bi_2O_3$ and chemical and physical combinations and mixtures thereof, and having an oxidation-reduction potential of from substantially —0.454 volt to —1.380 volt.

6. In a process for enhancing the conversion of chemical energy into electrical energy in an electrochemical reaction system having (A) a relatively reducible oxidant subsystem, including (A–1) gaseous oxidant reactant, and (A–2) an electron transfer species; (B) a relatively oxidizable fuel subsystem including (B–1) a gaseous fuel reactant, (B–2) an electron transfer species, said subsystems being electronically isolated from one another by an electrolyte, each of said subsystems including an electrode forming part of an electronic circuit, the electrodes being positioned in spaced relationship to one another and being permeable to said respective gaseous reactants, said electrodes having reactive surfaces including adjacent, spaced, internal surfaces, said liquid electrolyte being disposed in the space between said electrode internal surfaces and forming reactive interfaces at said electrodes, means for supplying a gaseous, reducible oxidant to said oxidation subsystems, means for supplying a gaseous, oxidizable fuel to said fuel subsystem, the steps of matching the oxidation-reduction potential of (A–1) with (A–2) within the range of ±0.15 volt, (A–1) being an oxygen-containing gas, and (A–2) being selected from the group consisting of $V_2O_4$, $V_2O_5$; $V_2O_3$, $V_2O_4$; $Sb_2O_3$, $Sb_2O_4$; $Sb_2O_3$, $Sb_2O_5$; $MoO_2$, $MoO_3$; $Cu_2O$, CuO; MnO, $MnO_2$; MnO, $Mn_2O_3$; Cu, $Cu_2O$; BiO, $Bi_2O_3$; and CoO, $Co_3O_4$ and chemical and physical combinations and mixtures thereof and having an oxidation-reduction potential of from substantially —0.838 to substantially —0.250 volt, matching the oxidation-reduction potential of (B–1) with (B–2) within the range of ±0.15 volt, (B–1) being selected from the group consisting of a hydrocarbon of from one to six carbon atoms and hydrogen and having an oxidation-reduction potential of from substantially —1.47 volt to substantially 0.32 volt, and (B–2) being selected from the group consisting of $WO_2$, $WO_3$; $Nb_2O_4$, $Nb_2O_5$; $Sb_2O_3$, $Sb_2O_4$; MnO, $Mn_2O_3$; MnO, $Mn_3O_4$; $MoO_2$, $MoO_3$; $V_2O_3$, $V_2O_4$; and BiO, $Bi_2O_3$ and chemical and physical combinations and mixtures thereof, and having an oxidation-reduction potential of from substantially —0.454 volt to substantially —1.380 volt.

References Cited

UNITED STATES PATENTS

| | | | |
|---|---|---|---|
| 2,914,596 | 11/1959 | Gorin et al. | 136—86 |
| 3,000,996 | 9/1961 | Usel. | |
| 3,032,600 | 5/1962 | Mayer. | |
| 3,040,115 | 6/1962 | Moos | 136—86 X |
| 3,134,697 | 5/1964 | Niedrach | 136—86 |
| 3,152,013 | 10/1964 | Juda | 136—86 |

FOREIGN PATENTS

| | | |
|---|---|---|
| 227,564 | 3/1960 | Australia. |
| 264,026 | 9/1913 | Germany. |

ALBERT B. CURTIS, *Primary Examiner.*

WINSTON A. DOUGLAS, *Examiner.*

UNITED STATES PATENT OFFICE
CERTIFICATE OF CORRECTION

Patent No. 3,360,401  December 26, 1967

Robert Grasselli et al.

It is hereby certified that error appears in the above numbered patent requiring correction and that the said Letters Patent should read as corrected below.

Column 5, line 45, for "ot" read -- to --; column 6, in the second table, second column, line 1 thereof, for "O$^-$" read -- O$^{--}$ --; same column 6, line 40, for Grop" read -- Group --; column 9, line 16, for "C$_n$H$_2$(n+h)" read -- $C_nH_{2(n+h)}$ --; line 22, for "2e$^-$1/2O$_2$" read -- 2e$^-$+1/2O$_2$ --; line 50, for "Nb$_2$O4" read -- Nb$_2$O$_4$ --; column 16, line 24, for "SbO$_3$" read -- Sb$_2$O$_3$ --; line 25, for "MnO$_3$" read -- MN$_2$O$_3$ --; column 17, line 39, strike out "oxidation-reduction potential".

Signed and sealed this 25th day of February 1969.

(SEAL)
Attest:

Edward M. Fletcher, Jr.  EDWARD J. BRENNER
Attesting Officer  Commissioner of Patents